United States Patent [19]

Tardot et al.

[11] 4,339,098
[45] Jul. 13, 1982

[54] RELEASE MECHANISM FOR AIRCRAFT RELEASED LOADS

[75] Inventors: Jacques Tardot, Gond Pontouvre; Roger Lambert, Soyaux, both of France

[73] Assignee: L'ETAT FRANCAIS, represente par le Delegue General pour l'Armement, Paris, France

[21] Appl. No.: 123,405

[22] Filed: Feb. 21, 1980

[51] Int. Cl.³ .............................................. B64D 17/38
[52] U.S. Cl. ............................ 244/151 B; 220/323; 220/326; 294/83 A; 244/138 R
[58] Field of Search ................ 244/147, 138 R, 149, 244/151 R, 151 A, 151 B; 292/37, 259, 182; 220/323, 326; 294/83 A, 94

[56] References Cited

U.S. PATENT DOCUMENTS

| | | | |
|---|---|---|---|
| 2,010,200 | 8/1935 | Rufener et al. | 292/37 |
| 3,758,055 | 9/1973 | Adams | 244/151 B |
| 3,792,884 | 2/1974 | Tutikawa | 292/37 |
| 3,964,700 | 6/1976 | Adams et al. | 244/138 R |
| 4,033,529 | 7/1977 | Bourgeois | 244/151 B |
| 4,132,327 | 1/1979 | Van Dyke et al. | 220/323 |

FOREIGN PATENT DOCUMENTS 2315434  1/1977  France ............................ 244/151 B

*Primary Examiner*—Galen L. Barefoot
*Attorney, Agent, or Firm*—Stevens, Davis, Miller and Mosher

[57] ABSTRACT

Apparatus is described for releasing a storage container from an inflatable support such as a parachute, comprising a container for holding the inflatable support, an attachment mechanism extending through the container, linear slide means engaging the attachment mechanism and a storage container when tension is applied to the attachment mechanism, and means for holding the attachment mechanism in tension until the inflatable support is inflated, whereby the storage container remains fixed to the inflatable support until tension on said attachment component is relieved.

6 Claims, 6 Drawing Figures

U.S. Patent Jul. 13, 1982 Sheet 2 of 2 4,339,098
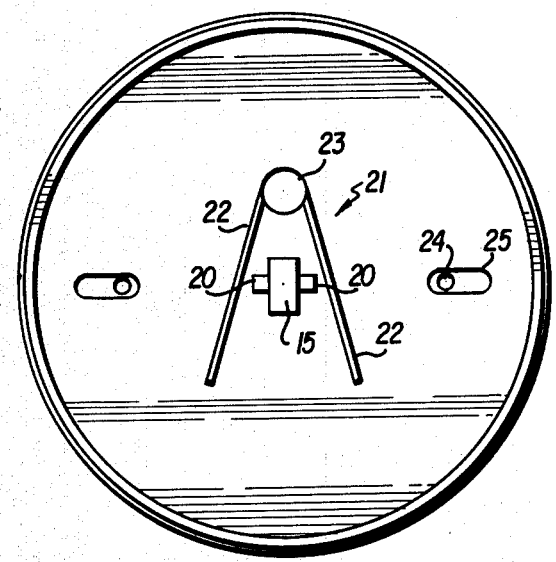
FIG. 4
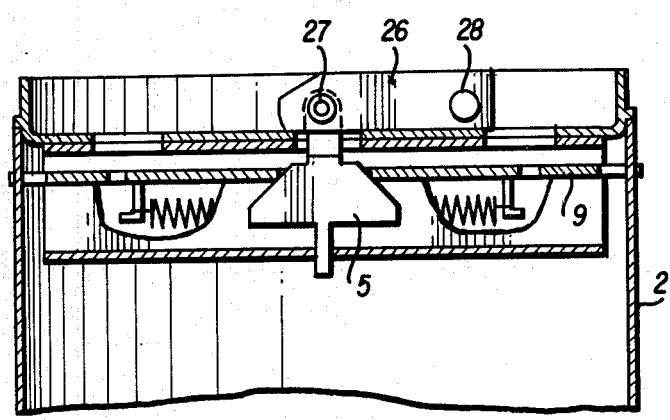
FIG. 5
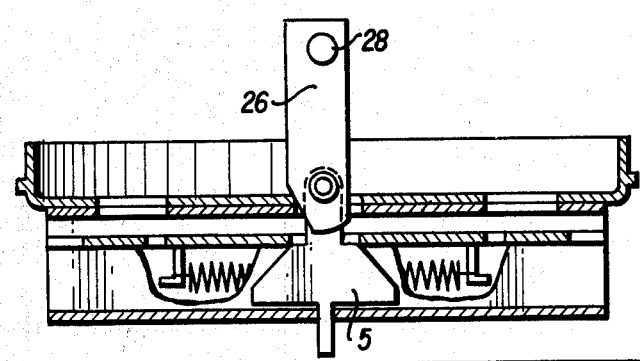
FIG. 6
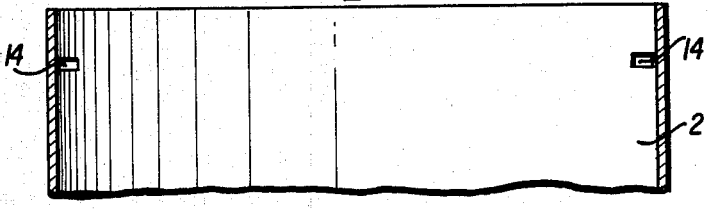

RELEASE MECHANISM FOR AIRCRAFT RELEASED LOADS

BACKGROUND OF THE INVENTION

The present invention concerns a load release mechanism, notably for use with a passive sonar buoy. Specifically, a mechanism which maintains the load in locked position during storage and which can be easily unlocked at a time of release is described.

Before being released or jettisoned to sea from an airplane or helicopter, passive sonar buoys comprise compact units of radio-electric equipment laid in waterproof containers, and/or electro-acoustic equipment. On contact with water, or the receptacle environment for a ground load, the electro-acoustic equipment separates from the radio-electric equipment, while remaining tied to the latter by an electrical and mechanical suspension means, usually a coiled cable, and lowers into the water down to a preset depth in the case of a passive submarine buoy. The radio-electric equipment is tied mechanically and electrically to an antenna which is to radiate electromagnetic waves toward the operating aircraft.

The essential problem brought on by the storage and release of a unit of the type described lies in the fact that this unit must not be damaged during storage when it comes in contact with water. Indeed, the storage of such loads involves a locking mechanism capable of maintaining the load locked safely while descending to its final resting place and which is easily manageable by the usual means after release.

SUMMARY OF THE INVENTION

The present invention provides a release mechanism for maintaining a load attached to a parachute container or other container for storing an inflatable support. The load is rigidly held fast to the bottom of the parachute container during storage and dropping of the combination load container. The release mechanism releases the load upon a lessening of tension applied to the container by virtue of the final descent of the load. The release mechanism further prevents relocking of the load to the container once full descent is achieved. The release mechanism of the invention is so constructed that release of the load can only be accomplished after a considerable tension has been applied by a parachute or other tension producing means followed by a cessation of the tension. Attachment of the load to the parachute container is, however, readily accomplished without a substantial force being applied to the release mechanism.

In one embodiment of the invention, an attachment component has one end extending through a centrally located opening in the bottom of a parachute container. The remaining end includes a catch having a surface for urging at least one horizontally mounted bolt end into an aperture on the load against the force of a biasing means when the attachment component is in its uppermost position. The attachment arm is held into this uppermost position by means of a flexible pin forced between a retaining member on the one end and the bottom of the parachute container.

The embodiment is so constructed that when the load and parachute container are deployed, the tension force of the parachute connecting lines frees the flexible pin while continuing to maintain the attachment arm in its most vertical position. When complete descent is reached, the tension provided by the parachute connecting lines is released and the attachment arm vertically descends freeing the bolt from locking position.

DESCRIPTION OF THE DRAWINGS

FIG. 4 is a drawing of the top of the bracket during the separation phase shown in FIG. 3.

FIG. 5 is a sectional device according to a second embodiment.

FIG. 6 illustrates the device of FIG. 5 during the separation of the load from its bracket.

DESCRIPTION OF A PREFERRED EMBODIMENT

Figure 1:
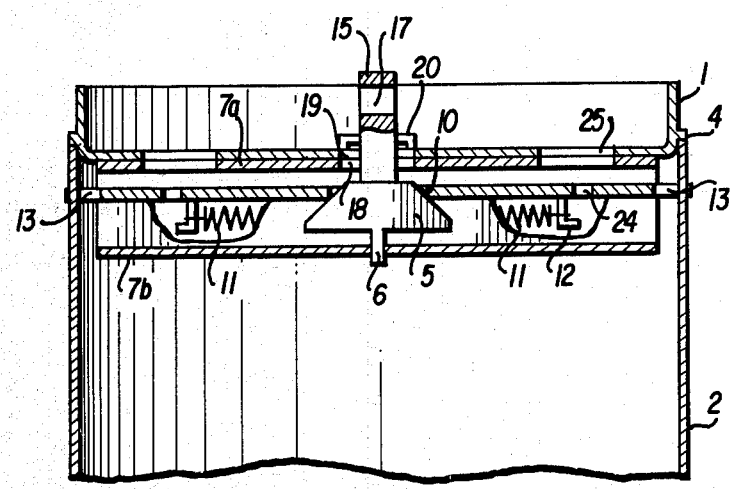
FIG. 1 is a sectional drawing of the device according to a first embodiment.
Figure 2:
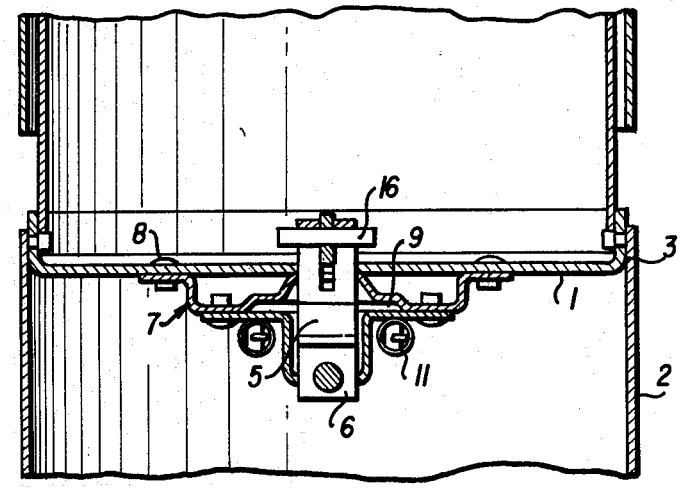
FIG. 2 is a sectional drawing of the device represented in FIG. 1.

The release mechanism for a load includes a container in which is held the parachute or other means of slowing the descent, such as a floating bag when the load is of the submarine passive sonar buoy type, etc. The bottom 1 of the container acts also as the storage means 2 of which only a part is represented, containing all of the electrical equipment necessary for its operation. The storage means 2 is connected by its upper edge 3 on the annular rim 4 designed on the bottom 1.

The locking and unlocking mechanism includes a catch 5 whose lever 6 goes through a guide 7 attached by any appropriate means such as rivets 8 to the bottom 1. Preferably, the top part 7a of the guide 7 is built-in with the bottom 1 in order to reduce manufacturing costs and assembly manpower, and only the bottom part 7b of the guide 7 is assembled to the top part 7a in order to permit a locking unit made of at least one lock bolt and preferably of two lock bolts 9 to move in a horizontal plane with no possibility of displacement in a vertical plane.

The lock bolts 9 delimit between themselves a clearance 10 for the passage of a part of the catch 5 and are each pushed towards their unlocked position by a spring 11 bearing on the support units 12 incorporated in the lock bolt 9.

The ends 13 of the lock bolts 9 are engaged, in locked position, in openings 14 provided in the body of the storage means 2. The main portion of the catch 5 is of truncated cone shape, the small base being engaged in space 10 dependant on a fastening 15 to which an unrepresented tensioning unit is connected and made of, for example, a rigging line of a parachute or a sling dependant on the parachute held in the container, the liaison between the attachment component 15 and the tension unit is ensured by a junction shackle 16 fitted into the opening 17 situated in the attachment component 15 which goes through the apertures 18 and 19 built into respectively the upper portion 7a of the guide and on the bottom 1. Retainers 20 are provided on the attachment component 15 and maintain for the locked position of catch 5 and for the locked position of the lock bolts, means of tensioning consisting of an elastic pin 21 whose elastic branches 22 are engaged under the retainers 20 and bear on the bottom 1 of the bracket, the aforesaid pin being attached by its extremity 23 on the aforesaid bottom 1 (FIG. 4).

Finally, the lock bolts 9 each having an opening 24 for positioning control of the ends 13 in the holes 14, access to these openings 24 being ensured by openings of oblong shape 25 set in the bottom 1 and the guide 7.

For storage of the load 2, it is connected to the bottom 1 of the container by shifting the ends 13 of the lock bolts 9 in their respective openings, while bringing the catch to its upper position and in locating the branches 22 of the locking pin 21 under the retainers 20.

The positioning of the lock bolts 9 can be done from the top through the access openings 25 using a pair of pliers for instance. In this locked position, the springs 11 tend to assume the low position of the catch 5 in that the ends of the lock bolts situated near the clearance 10 tend by their bearing on the inclined sides of the truncone, to lower further the aforesaid catch 5.

Figure 3:
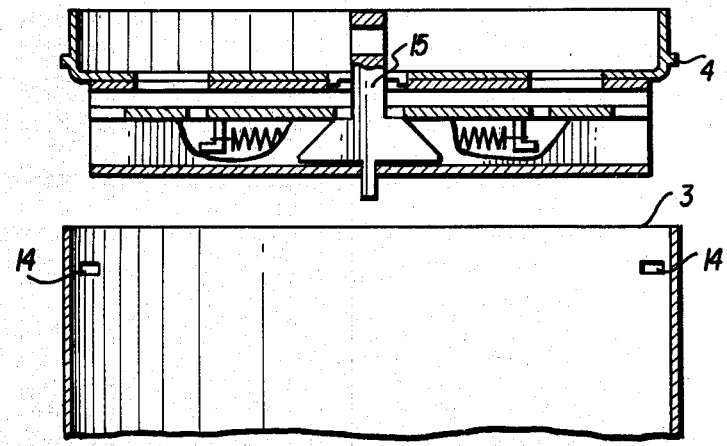
FIG. 3 illustrates the device of FIG. 1 during the separation of the load from its bracket.

Once the load and parachute are released and sufficient tension is exerted on the attachment component 15, the catch 5 is suddenly lifted, which permits the branches 22 to spring aside and free the catch which can, when tension ceases, fall back to the bottom of the guide (FIG. 3). The retainers 20 are engaged in the holes 18 and 19. The lock bolts are brought back towards their unlocked position by the springs 11 and come to bear on the small upper base of the aforesaid truncone. Due to this displacement towards the inside, the holes 24 occupy the position represented in FIG. 4. If tension is again exerted on the catch, this latter cannot be moved towards the top because of the position occupied by the lock bolts 9. The ends 13 of the lock bolts 9 during this inside displacement uncover the holes 14 of the storage means and comes off the bottom 1 and frees itself entirely.

The means of blocking the catch in the locked and unlocked position can be equally constituted by the means represented in FIGS. 5 and 6.

The attachment component 15 is articulated on a lever 26 by means of an axis 27, the greatest position of the aforesaid lever 26 laying on the bottom 1 in order to prevent any displacement of the catch 5 towards the bottom during the phase of storage or liaison of the load 2 with the container.

In the same manner as before, the unlocking is obtained by exerting tension on the catch 5. For that purpose, the tension element such as a parachute rigging line or a sling is attached in 28 to the aforesaid lever 26. The end of the lever opposite the hole 28 rests lightly on the bottom 1 for the blocking position. This end is shaped so that when the lock bolt is unlocked 9, it can be engaged in the openings 18 and 19 when the lever 26 is in the vertical position. In fact, the tension exerted towards the top of the lever 26 causes this latter to swing into vertical position. During this movement, the lock bolts 9 are more firmly embedded in the holes 14 of the load body and lock the load more firmly on its bracket. When the tension ceases, the catch 5 falls by gravity to the bottom of the guide 7, this movement being assured by the springs 11 which force the reentry of the lock bolts 9 which frees the storage means 2 from the bottom 1 (FIG. 6). In this case, the lock bolts 9 come to bear on the small upper base of the truncone so as to avoid any new locking and thus confirm the release of the load.

Of course, the invention is not at all limited to the embodiment described herein, but rather it is open to numerous variants which will be known to those skilled in the art.

What is claimed is:

1. A release mechanism for separating a storage container from a parachute comprising:
    a parachute container for holding a parachute;
    means for attaching a storage container to the bottom of said parachute container comprising: an attachment component having one end extending through a centrally located opening in the bottom of said parachute container for connecting to said parachute, said parachute providing a tension to said attachment component when deployed;
    linear slide means located on the bottom of said parachute container, said slide means having at least one horizontally movable end for engaging an opening in said storage container, said slide means being biased into engagement by a catch on the remaining end of said attachment component when tension is applied to said one end;
    means for maintaining tension on the one end of said attachment component until deployment of said parachute, said means for maintaining tension comprising a lever having one end pivoted to said attachment component, the remaining end of said lever being attached to the connecting lines of said parachute, said lever having a diameter less than said centrally located opening, and being pivoted into horizontal position with respect to said container bottom, whereby said storage container remains fixed to the bottom of said parachute container until tension is relieved from said attachment component.

2. A release mechanism for separating a storage container from a parachute comprising:
    a parachute container for holding a parachute;
    means for attaching a storage container to the bottom of said parachute container comprising: an attachment component havine one end extending through a centrally located opening in the bottom of said parachute container for connecting to said parachute, said parachute providing a tension to said attachment component when deployed;
    linear slide means located on the bottom of said parachute container, said slide means having at least one horizontally movable end for engaging an opening in said storage container, said slide means being biased into engagement by a catch on the remaining end of said attachment component when tension is applied to said one end;
    means for maintaining tension on the one end of said attachment component until deployment of said parachute, said means for maintaining tension comprising a retaining element located on the one end, and a flexible pin with two branches between said retaining element and said bottom, said pin branches being flexed so that they move away from retaining element in response to a force applied by said parachute to said attachment component, whereby said storage container remains fixed to the bottom of said parachute container until tension is relieved from said attachment component.

3. The release mechanism of claim 1 or 2, further comprising means for preventing said linear slide means from engaging said opening once tension is released from said attachment component.

4. The release mechanism of claim 1 or 2, wherein the catch connected to the remaining end of said attachment component is shaped as a truncone, the broader part of said truncone providing a bearing surface for said linear slide means before release of said attachment component, the narrower portion providing a bearing surface to said slider means after the release of said attachment.

5. The release mechanism according to claim 4, wherein said slider means comprises two horizontal spring biased bolts, said bolts having an end for engaging one of two openings in said storage container, and a remaining end communicating with said truncone, wherein said larger diameter portion of the truncone maintains said bolts in said opening when a tension is applied to said attachment arm.

6. The release mechanism according to claim 1 or 2, further comprising at least one opening in the bottom of said parachute container for permitting movement of said slider means into engagement with the storage container.

* * * * *